United States Patent
Zuber

(10) Patent No.: US 8,464,162 B2
(45) Date of Patent: Jun. 11, 2013

(54) SYSTEM AND METHOD OF RANKING AND SEARCHING FOR PROFESSIONAL PROFILES

(76) Inventor: Thomas Zuber, Los Angeles, CA (US)

( * ) Notice: Subject to any disclaimer, the term of this patent is extended or adjusted under 35 U.S.C. 154(b) by 144 days.

(21) Appl. No.: 12/885,325

(22) Filed: Sep. 17, 2010

(65) Prior Publication Data

US 2011/0066954 A1  Mar. 17, 2011

Related U.S. Application Data

(60) Provisional application No. 61/277,025, filed on Sep. 17, 2009.

(51) Int. Cl.

| | |
|---|---|
| *G06F 3/00* | (2006.01) |
| *G06F 7/00* | (2006.01) |
| *G06F 15/16* | (2006.01) |
| *G06F 17/00* | (2006.01) |
| *G06Q 10/10* | (2006.01) |
| *G06F 17/30* | (2006.01) |
| *G06Q 30/02* | (2006.01) |

(52) U.S. Cl.
CPC .......... *G06Q 10/10* (2013.01); *G06F 17/30867* (2013.01); *G06Q 10/107* (2013.01); *G06Q 30/0283* (2013.01)
USPC ............ 715/751; 707/734; 709/206; 705/400

(58) Field of Classification Search
USPC .... 715/751, 400; 707/734; 709/206; 705/400
See application file for complete search history.

(56) References Cited

U.S. PATENT DOCUMENTS

| | | | |
|---|---|---|---|
| 6,038,554 A * | 3/2000 | Vig | 705/400 |
| 6,314,420 B1 | 11/2001 | Lang et al. | |
| 6,327,590 B1 | 12/2001 | Chidlovskii et al. | |
| 6,739,508 B2 | 5/2004 | Ushioda et al. | |
| 7,167,855 B1 | 1/2007 | Koenig | |
| 7,502,804 B2 | 3/2009 | Cohen | |
| 2002/0049738 A1 | 4/2002 | Epstein | |
| 2003/0140037 A1 | 7/2003 | Deh-Lee | |
| 2003/0163349 A1 | 8/2003 | Ho | |
| 2004/0054649 A1 | 3/2004 | Mehregany | |
| 2004/0172282 A1 | 9/2004 | Benja-Athon | |
| 2006/0064411 A1 | 3/2006 | Gross et al. | |
| 2006/0122850 A1 | 6/2006 | Ward et al. | |
| 2006/0167942 A1 | 7/2006 | Lucas et al. | |
| 2006/0212305 A1 * | 9/2006 | Bogle et al. | 705/1 |
| 2006/0265237 A1 * | 11/2006 | Martin et al. | 705/1 |
| 2007/0033064 A1 | 2/2007 | Abrahamsohn | |
| 2007/0136429 A1 | 6/2007 | Fine et al. | |
| 2007/0168345 A1 | 7/2007 | Gibbs et al. | |
| 2008/0215583 A1 | 9/2008 | Gunawardena et al. | |

(Continued)

OTHER PUBLICATIONS

Jian Jiao et al., ExpertRank: An Expert User Ranking Algorithm in Online Communities, New Trends in Information and Service Science International Conference, Jun. 30, 2009, p. 674.

*Primary Examiner* — Doug Hutton, Jr.
*Assistant Examiner* — Li Sun
(74) *Attorney, Agent, or Firm* — Zuber Lawler & Del Duca LLP

(57) ABSTRACT

A method for searching and ranking professional profiles includes a profile ranking tool that assigns a numeric value to a professional's prestige and competence, called an overall quality score. Different weights are assigned to several different factors that rank a professional based on attributes such as one's peer rating, quality of education, breadth and depth of experience and the quality of work product.

3 Claims, 3 Drawing Sheets

U.S. PATENT DOCUMENTS

| | | |
|---|---|---|
| 2008/0281812 A1 | 11/2008 | Sotos |
| 2008/0301114 A1 | 12/2008 | Hibbets et al. |
| 2009/0024605 A1* | 1/2009 | Yang .................................. 707/5 |
| 2009/0043801 A1 | 2/2009 | LeClair et al. |
| 2009/0106225 A1 | 4/2009 | Smith et al. |
| 2009/0150229 A1* | 6/2009 | Shuster ........................... 705/12 |
| 2009/0192812 A1 | 7/2009 | Hurowitz |
| 2009/0307006 A1* | 12/2009 | Davis et al. ....................... 705/2 |
| 2009/0319288 A1* | 12/2009 | Slaney et al. ..................... 705/1 |
| 2010/0030722 A1* | 2/2010 | Goodson et al. ................. 706/54 |
| 2010/0106668 A1* | 4/2010 | Hawthorne et al. ............. 706/11 |

\* cited by examiner

120

LawLoop.com  Jonathan E. Smith, Esq. Logout Help
[Home] My profile Contacts Loops Events Messages () [____] [Search]

Welcome. Jonathan
Today is Thursday
February 12.2009     One-Click Communication          [Find a Lawyer]
Request for        [✉ Message] [✉ E-Mail] [🎤 Voice Call] [📹 Video Call]  [Post a Job]
Responses
2 contact requests   Document Management                Advertise on
4 loop invitationsl  Rooms                              LawLoop
Notifications    [✉ E-Mails] [Word Processor] [Spreadsheets]
12 notifications                                        AD
Calendar - Day View  [Presentations] [Images]
Thursday.
February 12       ⊞ Calendar
                  ☐ Profiles   Rank Profiles
▾Appointments (7) ☐ Loop Activity       ←—1200
Edit Select All Month View
11:00am              ☐ Michael Lewis, Esq. Made partner at...      AD
Event                ☐ Jonathan E. Smith, Esq. Received a new
Networking brunch       Comment from Matt Lendach, Technical Manager,
2:30pm
Video Call           "Jonathan, I loved your seminar last week.
...                  My head is swirling from the possibilities but
                     now I see how Patent Protection can be"...    LawUpdates.
Upcoming  See All                                                  Com
Events (5)                                                         for Federal
Tomorrow, 11:00am    Matt attended Jonathan's seminar Patent       Law Updates
Patent Law Seminar   Basics for Beginners                          Trademark Law
Saturday,3:00pm      ☐ Stacey Conrad, Esq. joined Lawfirm XYZ as   Judicial Opinion
...                     an Associate 5:42pm                        Summary
▾To-Do               ☐ Zuber & Taillieu LLP added Counsel Michelle AZ Court Grants
(14)  Edit|See All      Nichole, Esq. and Paralegal Stephen Berg   Injunctive Relief
Call Client X [Add]     5:32pm                                     to Garduno in
about matter Y  X    ☐ At the Office by Jonathan E. Smith, Esq.    Restaurant
...                     4 New Photos                               Trademark Suit
▾Birthdays  See All                                                Versus Tortilla,
Today                                                              Inc.
Robert I. Thomas,                                                  xxxxxx
Esq.                 ☐ Rachel Warren, Esq. has joined the loop     More updates >>
Tomorrow                Beverly Hills IP                           LawUpdates.com
Jameson P.           ☐ Jonathan E. Smith, Esq. has posted a        for Legal Industry
Menwether, Esq.         new photo to the album At the Office       News
                        "This is after our defeat of the           Aide's Tax
Suggested               plaintiff after only 3 hours"              Problems Caused
Contacts             ☐ Irving Lansbury, Esq. Has connected with    by LFS: "Late-
◁1 of 4▷                Marcel Jacob Levers him, Esq.  2:14pm      Filing Syndrome"

Lawrence Michael Thom, Esq.                   January 27 2009
                     Add as a Contact                              More news >>

SYSTEM AND METHOD OF RANKING AND SEARCHING FOR PROFESSIONAL PROFILES

CROSS REFERENCE TO RELATED APPLICATIONS

This application claims priority to U.S. Provisional Patent Application U.S. 61/277,025 titled "System And Method Of Ranking And Searching For Professional Profiles," filed Sep. 17, 2009, and is related to U.S. patent application Ser. No. 12/575,442, filed Oct. 7, 2009, U.S. patent application Ser. No. 12/493,096, filed Jun. 26, 2009, and U.S. Provisional Patent Application No. 61/210,627, filed Mar. 20, 2009, the contents of all of which are incorporated herein in their entirety by reference.

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The prior art includes several general methods of ranking professional profiles. A professional rating system and method is disclosed in U.S. Patent Publication No. 2006/0294138 to Stolba. Stolba teaches a system for rating professionals comprising means for storing information about a plurality of professionals in a database, including a name and contact information of each of said professionals, means for a user to search said database via a web site, means for said user provide the name and contact information of a professional to said database; and means for said user to provide a rating of said professional. The rating may be based on the expertise of said professional, the cost of said professional or the ethics of said professional, and may include a comment about the professional. The web site preferably has means for said user to search said database by selecting a category of professionals, a subcategory of professionals and a geographic area for said professional.

Another such system is disclosed in U.S. Patent Publication No. 2006/0004623 to Jasti. Jasti teaches a system and method for online professional services networks that creates and provides access to professional service provider databases. Professionals are linked to others based on their referral relationships. The networks allow users, e.g., network members and other consumers (e.g. patients, clients) to search/identify, evaluate and select professionals based on their trusted relations and recommendations, as well as to perform various other tasks online such as negotiate service terms as well as request and submit payment.

Another prior art system is disclosed in U.S. Patent Publication No. 2006/0212338 to Bogle that teaches a method and apparatus for identifying candidates for a position. A position is defined in a campaign for the position. The method includes steps of and/or apparatus that performs steps of sending campaign information to a plurality of contacts, receiving a candidate referral from at least one of the plurality of contacts, and ranking candidate profiles based on candidate profile rank, wherein the candidate profile rank is based at least in part on a referral rating.

Another prior art system is disclosed in U.S. Patent Publication No. 2006/0212448 to Bogle that is a method and apparatus for ranking candidates. This method includes steps of and/or apparatus that performs steps of receiving candidate referrals from a plurality of referrers, generating a predicted prospect ranking (PPR) based at least in part on received candidate referrals, and displaying a candidate list ranked by the PPR.

Yet another prior art system is disclosed in U.S. Patent Publication No. 2009/0012954 to Bogle. This prior art reference discloses an electronic profile ranking in which a web page displayable on a display device is served to an electronic device. The displayed web page includes a user interface comprising a data-input field. At least one search term entered by a user of the electronic device and pertaining to a vocational characteristic is received from the electronic device. A set of profiles associated with respective entities is accessed. Each profile includes indicators of a plurality of vocational characteristics corresponding to the associated entity. The at least one search term is compared to the indicators associated with each profile of the set. Each profile of the set is ranked according, at least in part, to the existence of at least one positive match between the at least one search term and the indicators associated with each profile of the set and a predetermined weight assigned to each said positive match.

None of the prior art systems disclose the specific inventive features of the present invention. Therefore, there is a need in the art for a professional profile ranking tool within the context of a social networking community that ranks profiles based on various profile factors that evaluate competency, peer rating, experience, and other attributes of a professional's ability.

BRIEF SUMMARY OF THE INVENTION

The present invention discloses a profile ranking tool and a method for ranking professional profiles. In an online community, and within the context of an online social network, members of the online social network are professionals each having at least one profile. The profile ranking tool allows a member to rank profiles of professionals based on an Overall Quality Score assigned to each profile in accordance with an assessment of the competence of the owner of the profile. The competence of the owner of the profile is based on the familiarity, experience, work product, or some other criteria described herein for determining the relevance of the owner of the profile to the user conducting the search or assigning the ranking. The Overall Quality Score is a function of a peer rating factor (also referred to as "esteem among colleagues factor") and at least one or more of an education factor, an experience factor, and a work products factor. The Overall Quality Score is further a function of data present in the profile itself.

Other features and advantages of the present invention will become more apparent from the following description of the embodiments, taken together with the accompanying several views of the drawings, which illustrate, by way of example, the principles of the invention.

BRIEF DESCRIPTION OF THE SEVERAL VIEWS OF THE DRAWING

FIG. 1 is a screen shot of a member's home page from which a member can initiate a search and ranking of other member profiles by clicking an icon;

FIG. 3 is a list of profiles generated by clicking on an icon on the member home page.

DETAILED DESCRIPTION OF THE INVENTION

Figure 2:
FIG. 2 is a profile page of a member of an online community.

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

In a system described in U.S. patent application Ser. Nos. 12/525,442 and 12/493,096, both incorporated herein in their entirety by reference, and in U.S. Provisional Patent Application No. 61/210,627, as well as U.S. Provisional Patent Application titled System And Method Of Ranking And Searching For Professional Profiles, both incorporated herein in their entirety by reference, members of a social networking community are professionals such as lawyers, accountants, doctors, bankers, teachers, artists, or any other type of person that provides services to others.

It should be noted that the term "profile" includes, in addition to a user's public profile containing pages and/or information visible to the public generally, information that is visible only to the member herself, information visible only to users specified by the member, information visible as specified by the member, and information that may not be visible to other members. Additionally, the term "function," as used extensively herein, is intended to allow for other factors not specifically cited or referenced in the specification or claims to also be part of the function without limiting the scope of the claimed invention. Accordingly, other factors with varying weights may be further used to more accurately search for and rank profiles in terms of the needs of a member of an online social networking community of the present invention.

It should further be noted that the present invention contemplates that weights indicated in association with the various factors may also be adjusted as additional factors are added or as necessary to provide a more accurate search and ranking of profiles in terms of the needs of a member of an online social networking community of the present invention.

Figure 3:
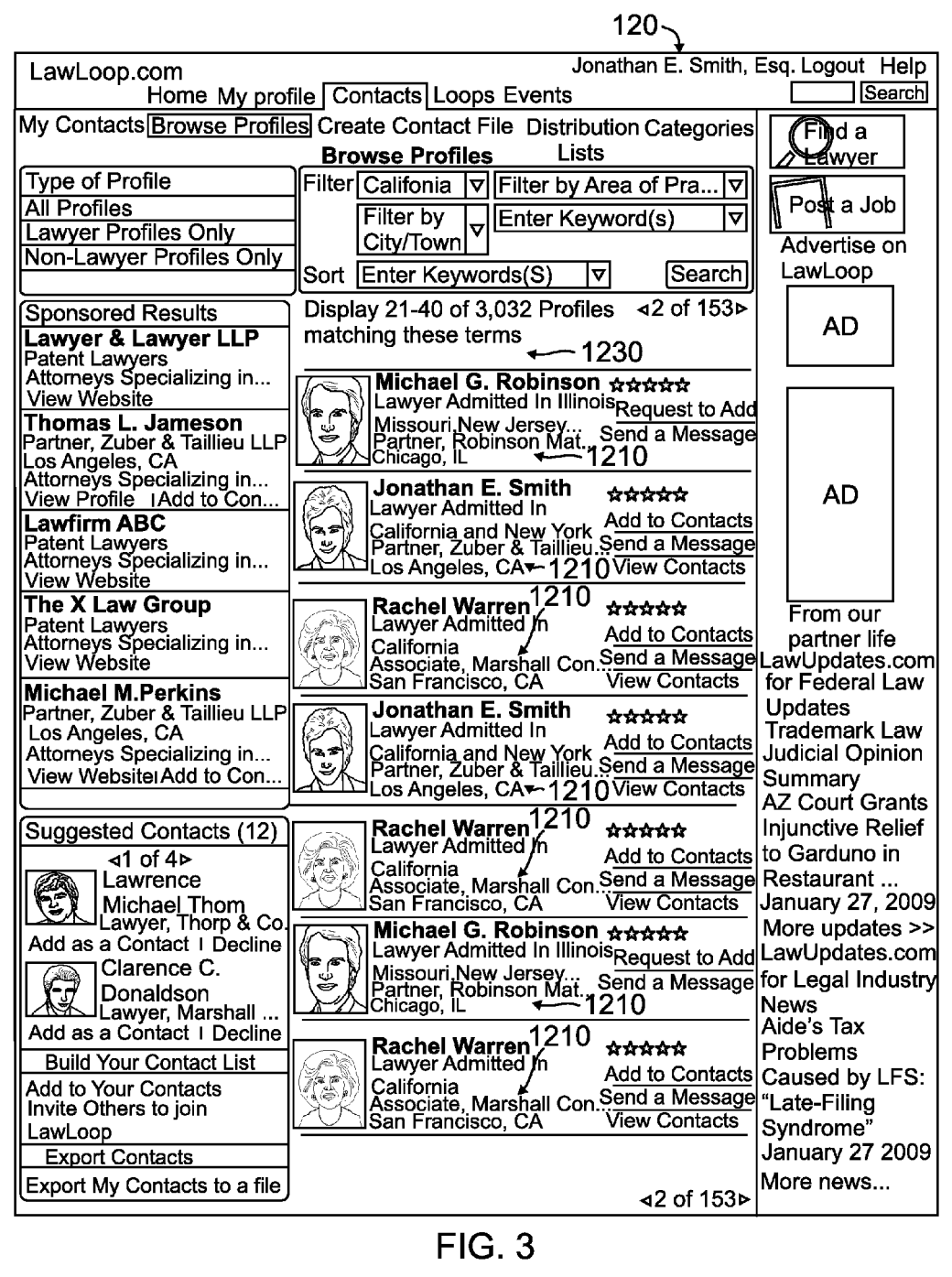

FIG. 1 is a member's home page from which a member 120 can initiate a search and ranking of other member profiles 1210 by clicking an icon 1200. The member's home page shows one embodiment in which several one-click functionalities and sub-modules are accessible to the member 120. One-click options such as icon 1200 are available to the member 120 as "buttons" displayed on the user's monitor or other graphical user interface. FIG. 2 is a profile page of a member 120 of an online community. FIG. 3 is a listing of member profiles 1210 generated by clicking on the icon 1200 from the member's home page.

Embodiment #1

In a first embodiment of the present invention, at least a plurality of the members 120 are persons who have designated themselves as lawyers in an occupation field on their respective profiles 1210, and the member 120 described above owning the profile depicted at FIG. 2 may rank profiles 1210 by clicking on an icon 1200 on his/her home page depicted at FIG. 1, thereby causing a list 1230 of profiles 1210 like the list 1230 depicted at FIG. 3 to appear. The list 1230 consists of ranked profiles 1210 of all the members 120 of the community who have so designated themselves as lawyers, and does not consist of any profiles 1210 of any members 120 who have not so designated themselves as lawyers.

In this embodiment of the present invention, the lawyer profiles 1210 are ranked in accordance with their Overall Quality Score, where a lawyer's profile 1210 having a higher Overall Quality Score ranks higher than a lawyer's profile 1210 having a lower Overall Quality Score, wherein each lawyer profile's Overall Quality Score is determined using a formula as follows:

Overall Quality Score=(Factor 1)(0.4)+(Factor 2)(0.2)+(Factor 3)(0.2)+(Factor 4)(0.1)+(Factor 5)(0.1)

Factors identified in the above equation are determined as follows:

Esteem Among Colleagues Factor (Peer Rating Factor): Weight of 0.4

For a LawLoop.com Lawyer Rating, which in regard to each lawyer is a summation total of "Rate this Lawyer" votes pertaining to such lawyer, only a lawyer can vote (and only through his/her LawLoop.com profile account). The number of lawyers who vote counts, and the vote of a lawyer with a higher LawLoop.com Overall Quality Score counts more than the vote of a lawyer with a lower LawLoop.com Overall Quality Score. Thus:

Esteem Among Colleagues Factor_=($\Sigma$((Rate this Lawyer vote of each lawyer)×(that lawyer's LawLoop.com Overall Quality Score))1−$n/n$)×($f(n)=\lambda e-\lambda n$)

where n=the number of lawyers who voted on the LawLoop.com Rating.

Note: The presence of the exponential distribution subroutine is explained via example at "Experience Factor" below.

Education Factor: Weight of 0.2

A lawyer's education factor is determined by the following:

(0.25×overall score of college)+(0.75×(overall score of law school from which J.D. degree was obtained(or L.L.M. for a lawyer who received his/her first law degree in a foreign territory)))

In the instance of each college and law school, the present invention uses the "overall score" cited in U.S. New & World Report rankings of colleges and graduate schools. Other published and unpublished rankings of colleges and graduate schools may also be used, and are therefore within the scope of use for the education factor aspect of the present invention.

Experience Factor: Weight of 0.2

$f(n)=\lambda e-\lambda n$

Where n=the number of years of active membership in a relevant state or national bar of practicing lawyers (i.e.: assigning a value to this "Experience Factor" in accordance with an exponential distribution equation will recognize diminishing returns—e.g.: a lawyer with 2 years of experience may be nearly twice as experienced as a lawyer with 1 year of experience, but a lawyer with 30 years of experience is typically not nearly twice as experienced as a lawyer with 15 years of experience).

Popularity of Articles Factor: Weight of 0.1

For the Popularity of Articles Factor, which in regard to each lawyer is a weighted average of "Rate this Article" votes pertaining to such lawyer's publications, only a lawyer can vote (and only through his/her LawLoop.com profile account). The number of lawyers who vote counts, and the vote of a lawyer with a higher LawLoop.com Overall Quality Score will count more than the vote of a lawyer with a lower LawLoop.com Overall Quality Score. Thus:

Popularity of Articles Factor=($\Sigma$LawLoop.com Article Rating $1-n/n \times (f(n)=\lambda e-\lambda n)$ In regard to each publication, the LawLoop.com Article Rating=($\Sigma$((Rate this Article vote of each lawyer)×(that lawyer's LawLoop.com Overall Quality Score))$1 \times y/y) \times (f(y)=\lambda e-\lambda y)$
Where: n=the number of the lawyer's articles.
  y=the number of lawyers who voted on the LawLoop.com Article Rating.
Note: The presence of the exponential distribution sub-routines is explained via example at "Experience Factor" above.
Popularity of Seminars Factor: Weight of 0.1

For the Popularity of Seminars Factor, which in regard to each lawyer is a weighted average of the "Rate this Seminar" votes pertaining to such lawyer's seminars, only a lawyer can vote (and only through his/her LawLoop.com profile account. The number of lawyers who vote counts, and the vote of a lawyer with a higher LawLoop.com Overall Quality Score will count more than the vote of a lawyer with a lower LawLoop.com Overall Quality Score. Thus:

Popularity of Seminars Factor=($\Sigma$Lawloop.Com Seminar Rating $1-n/n \times (f(n)=\lambda e-\lambda n)$ In regard to each seminar, the LawLoop.com Seminar Rating=($\Sigma$((Rate this Seminar vote of each lawyer)×(that lawyer's LawLoop.com Overall Quality Score))$1-y/y) \times (f(y)=\lambda e-\lambda y)$
Where: n=the number of the lawyer's seminars.
  y=the number of lawyers who voted on the LawLoop.com Seminar Rating.
Note: The presence of the exponential distribution sub-routines is explained via example at "Experience Factor" above.

Embodiment #2

In each instance, a lawyer search in a particular city/state will rank lawyer profiles 1210 that cite a business office in such city/state based on their LawLoop.Com Overall Quality Score, determined by the following six factors, weighted in each instance as indicated.
Familiarity Factor: Weight of 0.5
  The Familiarity Factor represents the number of Shared Contacts each lawyer has relative to the searcher.
Esteem Among Colleagues Factor (Peer Rating Factor): Weight of 0.2

For the LawLoop.com Lawyer Rating, which in regard to each lawyer is a weighted average of "Rate this Lawyer" votes pertaining to such lawyer, only a lawyer can vote (and only through his/her LawLoop.com profile account). The number of lawyers who vote counts, and where the vote of a lawyer with a higher LawLoop.com Overall Quality Score will count more than the vote of a lawyer with a lower LawLoop.com Overall Quality Score. Thus:

Esteem Among Colleagues Factor=($\Sigma$((Rate this Lawyer vote of each lawyer)×(that lawyer's LawLoop.com Overall Quality Score))$1-n/n) \times (f(n)=\lambda e-\lambda n)$ Where n=the number of lawyers who voted on the LawLoop.com Rating.
Note: The presence of the exponential distribution sub-routine is explained via example at "Experience Factor" below.
Education Factor: Weight of 0.1

A lawyer's education factor is determined by the following:

(0.25×overall score of college)+(0.75×(overall score of law school from which J.D. degree was obtained(or L.L.M. for a lawyer who received his/her first law degree in a foreign territory)))

In the instance of each college and law school, the present invention uses the "overall score" cited in U.S. New & World Report rankings of colleges and graduate schools. Other published and unpublished rankings of colleges and graduate schools may also be used, and are therefore within the scope of use for the education factor aspect of the present invention.
Experience Factor: Weight of 0.1

$f(n)=\lambda e-\lambda n$

Where n=the number of years of active membership in a relevant state or national bar of practicing lawyers (i.e.: assigning a value to this "Experience Factor" in accordance with an exponential distribution equation will recognize diminishing returns—e.g.: a lawyer with 2 years of experience may be nearly twice as experienced as a lawyer with 1 year of experience, but a lawyer with 30 years of experience is typically not nearly twice as experienced as a lawyer with 15 years of experience).
Popularity of Articles Factor: Weight of 0.05

For the Popularity of Articles Factor, which in regard to each lawyer is a weighted average of "Rate this Article" votes pertaining to such lawyer's articles, only a lawyer can vote (and only through his/her LawLoop.com profile account), where the number of lawyers who vote counts, and where the vote of a lawyer with a higher LawLoop.com Overall Quality Score will count more than the vote of a lawyer with a lower LawLoop.com Overall Quality Score. Thus:

Popularity of Articles Factor=($\Sigma$LawLoop.com Article Rating $1-n/n \times (f(n)=\lambda e-\lambda n)$ Where, in regard to each article, the LawLoop.com Article Rating=($\Sigma$((Rate this Article vote of each lawyer)×(that lawyer's LawLoop.com Overall Quality Score))$1-y/y) \times (f(y)=\lambda e-\lambda y)$
Where: n=the number of the lawyer's articles; and
  y=the number of lawyers who voted on the LawLoop.com Article Rating.
Note: The presence of the exponential distribution sub-routines is explained via example at "Experience Factor" above.
Popularity of Seminars Factor: Weight of 0.05

For the Popularity of Seminars Factor, which in regard to each lawyer is a weighted average of "Rate this Seminar" votes pertaining to such lawyer's seminars, only a lawyer can vote (and only through his/her LawLoop.com profile account), where the number of lawyers who vote counts, and where the vote of a lawyer with a higher LawLoop.com Overall Quality Score will count more than the vote of a lawyer with a lower LawLoop.com Overall Quality Score. Thus:

Popularity of Seminars Factor=($\Sigma$LawLoop.com Seminar Rating $1-n/n \times (f(n)=\lambda e-\lambda n)$ Where, in regard to each seminar, the LawLoop.com Seminar Rating=($\Sigma$((Rate this Seminar vote of each lawyer)×(that lawyer's LawLoop.com Overall Quality Score))$1-y/y) \times (f(y)=\lambda e-\lambda y)$
Where: n=the number of the lawyer's seminars; and
  y=the number of lawyers who voted on the LawLoop.com Seminar Rating.
Note: The presence of the exponential distribution sub-routines is explained via example at "Experience Factor" above.

Embodiment #3

In each instance, a lawyer search in a particular city/state will rank lawyer profiles 1210 that cite a business office in such city/state based on their LawLoop.Com Overall Quality Score, determined by the following six factors, weighted in each instance as indicated:

Familiarity Factor: Weight of 0.5

The Familiarity Factor represents the number of Shared Contacts each lawyer has relative to the searcher, according to the following:

(0.6×(the number of Shared Contacts each lawyer has relative to the searcher))+(0.2×(the number of Shared Contacts each lawyer has relative to the searcher's Contacts)+(0.2×(the number of Shared Contacts each lawyer's Contacts has relative to the searcher))

Esteem Among Colleagues Factor (Peer Rating Factor): Weight of 0.2

For the LawLoop.com Lawyer Rating, which in regard to each lawyer is a weighted average of "Rate this Lawyer" votes pertaining to such lawyer, only a lawyer can vote (and only through his/her LawLoop.com profile account), where the number of lawyers who vote counts, and where the vote of a lawyer with a higher LawLoop.com Overall Quality Score will count more than the vote of a lawyer with a lower LawLoop.com Overall Quality Score. Thus:

Esteem Among Colleagues Factor=(Σ((Rate this Lawyer vote of each lawyer)×(that lawyer's LawLoop.com Overall Quality Score))1−$n/n$)×($f(n)=\lambda e-\lambda n$)

Where n=the number of lawyers who voted on the LawLoop.com Rating.

Note: The general reason for the exponential distribution sub-routine is explained via example at "Experience Factor" below.

Education Factor: Weight of 0.1

A lawyer's education factor is determined by the following:

(0.25×overall score of college)+(0.75×(overall score of law school from which J.D. degree was obtained(or L.L.M. for a lawyer who received his/her first law degree in a foreign territory)))

In the instance of each college and law school, the present invention uses the "overall score" cited in U.S. New & World Report rankings of colleges and graduate schools. Other published and unpublished rankings of colleges and graduate schools may also be used, and are therefore within the scope of use for the education factor aspect of the present invention.

Experience Factor: Weight of 0.1

$$f(n)=\lambda e-\lambda n$$

Where n=the number of years of active membership in a relevant state or national bar of practicing lawyers (i.e.: assigning a value to this "Experience Factor" in accordance with an exponential distribution equation will recognize diminishing returns—e.g.: a lawyer with 2 years of experience may be nearly twice as experienced as a lawyer with 1 year of experience, but a lawyer with 30 years of experience is typically not nearly twice as experienced as a lawyer with 15 years of experience).

Popularity of Articles Factor: Weight of 0.05

For the Popularity of Articles Factor, which in regard to each lawyer is a weighted average of "Rate this Article" votes pertaining to such lawyer's articles, only a lawyer can vote (and only through his/her LawLoop.com profile account), where the number of lawyers who vote counts, and where the vote of a lawyer with a higher LawLoop.com Overall Quality Score will count more than the vote of a lawyer with a lower LawLoop.com Overall Quality Score. Thus:

Popularity of Articles Factor=(ΣLawLoop.com Article Rating 1−$n/n$×($f(n)=\lambda e-\lambda n$)

Where, in regard to each article, the LawLoop.com Article Rating=(Σ((Rate this Article vote of each lawyer)×(that lawyer's LawLoop.com Overall Quality Score))1−y/y)× ($f(y)=\lambda e-\lambda y$)

Where: n=the number of the lawyer's articles; and
y=the number of lawyers who voted on the LawLoop.com Article Rating.

Note: The presence of the exponential distribution sub-routines is explained via example at "Experience Factor" above.

Popularity of Seminars Factor: Weight of 0.05

For the Popularity of Seminars Factor, which in regard to each lawyer is a weighted average of "Rate this Seminar" votes pertaining to such lawyer's seminars, only a lawyer can vote (and only through his/her LawLoop.com profile account), where the number of lawyers who vote counts, and where the vote of a lawyer with a higher LawLoop.com Overall Quality Score will count more than the vote of a lawyer with a lower LawLoop.com Overall Quality Score. Thus:

Popularity of Seminars Factor=(ΣLawLoop.com Seminar Rating 1−$n/n$×($f(n)=\lambda e-\lambda n$)

Where, in regard to each seminar, the LawLoop.com Seminar Rating=(Σ((Rate this Seminar vote of each lawyer)×(that lawyer's LawLoop.com Overall Quality Score))1−y/y)× ($f(y)=\lambda e-\lambda y$)

Where: n=the number of the lawyer's seminars; and
y=the number of lawyers who voted on the LawLoop.com Seminar Rating.

Note: The presence of the exponential distribution sub-routines is explained via example at "Experience Factor" above.

It is to be understood that other embodiments may be utilized and structural and functional changes me be made without departing from the scope of the present invention. The foregoing descriptions of the embodiments of the invention have been presented for the purposes of illustration and description. It is not intended to be exhaustive or to limit the invention to the precise forms disclosed. Accordingly, many modifications and variations are possible in light of the above teachings. It is therefore intended that the scope of the invention not be limited by this detailed description.

The invention claimed is:

1. A method for ranking and searching professional profiles in an online social network, comprising:
    accessing the online social network, wherein the online social network has members, each of the members being a professional and having at least one profile;
    searching the professional profiles of the members in the online social network using a profile ranking tool, wherein the professional profiles are ranked based on an overall quality score assigned to each of the members;
    wherein the overall quality score of each member is a function of the following:
        a peer rating factor determined by votes assigned to the each member by other members of the online social network, each of the assigned votes weighted as a function of the overall quality score of the member assigning the vote;
        an education factor determined by a peer rating value assigned to at least one school attended by the each member;

an experience factor determined by a length of time of experience of the each member;

a popularity of articles factor determined by votes assigned to the articles written by the each member by other members of the online social network, each of the assigned votes weighted as a function of the overall quality score of the member assigning the vote;

a popularity of seminars factor, determined by votes assigned to the seminars given by the each member by other members of the online social network, each of the assigned votes weighted as a function of the overall quality score of the member assigning the vote; and a familiarity factor determined by a number of shared contacts the each member has in common with the member searching for professional profiles.

2. The method of claim 1, wherein the peer rating factor is multiplied by 0.2, the education factor is multiplied by 0.1, the experience factor is multiplied by 0.1, the popularity of articles factor is multiplied by 0.05, the popularity of seminars factor is multiplied by 0.05, and the familiarity factor is multiplied by 0.5.

3. A method for ranking and searching professional profiles in an online social network, comprising:

accessing the online social network, wherein the online social network has members, each of the members being a professional and having at least one profile;

searching the professional profiles of the members in the online social network using a profile ranking tool, wherein the professional profiles are ranked based on an overall quality score assigned to each of the members;

wherein the overall quality score of each member is a function of the following:

a peer rating factor determined by votes assigned to the each member by other members of the online social network, each of the assigned votes weighted as a function of the overall quality score of the member assigning the vote;

an education factor determined by a peer rating value assigned to at least one school attended by the each member;

an experience factor determined by a length of time of experience of the each member;

a work products factor determined by votes assigned to the work products of the each member by other members of the online social network, each of the assigned votes weighted as a function of the overall quality score of the member assigning the vote, wherein the work products include articles written by the each member and seminars given by the each member; and a familiarity factor determined by a number of shared contacts the each member has in common with the member searching for professional profiles.

* * * * *